United States Patent
Oxenrider

[15] 3,668,181
[45] June 6, 1972

[54] PURIFICATION OF POLYCARBONATE RESINS

[72] Inventor: Bryce C. Oxenrider, Florham Park, N.J.

[73] Assignee: Allied Chemical Corporation, New York, N.Y.

[22] Filed: Mar. 6, 1970

[21] Appl. No.: 17,348

Related U.S. Application Data

[63] Continuation-in-part of Ser. No. 719,760, Apr. 8, 1968, abandoned.

[52] U.S. Cl. ...................................................260/47 XA
[51] Int. Cl. ...........................................................C08g 17/13
[58] Field of Search ...............................................260/47 XA

[56] References Cited

UNITED STATES PATENTS

| | | | |
|---|---|---|---|
| 3,376,261 | 4/1968 | Jackson et al. | 260/47 XA |
| 3,240,755 | 3/1966 | Cawthon et al. | 260/47 XA |

Primary Examiner—Samuel H. Blech
Attorney—Arthur J. Plantamura

[57] ABSTRACT

Crude precipitated polycarbonate resin obtained by the reaction of bisphenol A and phosgene, preferably in an aqueous alkaline emulsion containing a water-insoluble partial solvent for the resin, is purified by extraction with aqueous methanol or dimethoxy ethane or a mixture thereof.

9 Claims, No Drawings

PURIFICATION OF POLYCARBONATE RESINS

This application is a continuation-in-part application of U.S. Ser. No. 719,760, filed Apr. 8, 1968 now abandoned.

BACKGROUND OF THE INVENTION

U. S. Pat. No. 3,240,755 teaches that polycarbonate polymer resins can be obtained by reacting together phosgene and bisphenol A in an aqueous alkaline emulsion containing a water-insoluble reaction partial solvent for the polycarbonate resin. The term "reaction partial solvent" connotes that the polycarbonate resin reaction product is soluble in the partial solvent up to a certain molecular weight limit. When in the course of the polymerization reaction the molecular weight of the polycarbonate resin rises above this limit, it becomes insoluble in the reaction partial solvent and precipitates out. This continuous precipitation process thus enables the preparation of polycarbonate resin having a relatively narrow molecular weight distribution.

Suitable reaction partial solvents may be either a single solvent or a mixture of one or more solvents with one or more nonsolvents.

Examples of suitable single reaction partial solvents are butyl chloride, amyl chloride, n-propyl chloride, and the like. Typical solvents which may suitably be employed in forming a solvent-nonsolvent mixture include methylene chloride, ethylene chloride, 1,4-dichlorobutane, benzene, toluene, and xylene. Typical nonsolvents include aliphatic saturated ethers such as isopropyl ether and n-butyl ether and hydrocarbons such as hexane, heptane and isooctane. Preferably, the partial solvent consists of a mixture of a solvent with a nonsolvent. Most preferably, the partial solvent consists of a mixture of a solvent with a combination of two nonsolvents of different chemical type, i.e., the nonsolvent is a combination of an aliphatic ether and an aliphatic hydrocarbon.

According to the process of U.S. Pat. No. 3,240,755, the polycarbonate resin, as soon as it reaches a given molecular weight, precipitates from the partial solvent in particulate form swollen with partial solvent. The precipitated resin also contains a number of other impurities all of which must be substantially completely removed to provide resin product of suitable quality for use in most applications. Impurities generally present in the precipitated polycarbonate resin include partial solvent plus unreacted bisphenol A, low molecular weight oligomer, water, and nonvolatile inorganic impurities comprising mainly sodium chloride, sodium carbonate and sodium hydroxide. Additionally, the resin has reactive phenate or chloroformate end groups which must be neutralized to provide a stable product.

German Auslegeschrift No. 1,255,311 describes a process for the recovery of particulate polycarbonate comprising (a) reacting phosgene with an aqueous caustic solution of bisphenol A (b) extracting the precipitated polycarbonate with a water-insoluble solvent for the polycarbonate (c) mixing the solution obtained in step (b) with sufficient nonsolvent to precipitate the polycarbonate as a sticky mass (d) letting the sticky mass stand and then decanting the solvent/nonsolvent mixture and (e) milling the polycarbonate.

German Auslegeschrift No. 1,255,312 describes a process for recovering particulate polycarbonate from solution comprising concentrating the solution or adding to it a miscible poor solvent for polycarbonate and then allowing the concentrated solution or mixture to stand until the polycarbonate forms a solid crumbly mass.

Other polycarbonate synthetic procedures known to the art likewise afford solid, generally particulate polycarbonate resin containing impurities which must be removed to provide resin of acceptable quality. However, it is to be emphasized that the preferred polycarbonate preparative method is the continuous precipitation method described in U.S. Pat. No. 3,240,755.

U.S. Pat. No. 3,240,755 describes a process for the purification of precipitated crude polycarbonate resin comprising the steps of neutralizing the inorganic base contaminant present in the resin particles by slurrying with aqueous inorganic acid and then removing the reaction partial solvent occluded in the swollen resin particles by azeotropic distillation of the aqueous acid/polycarbonate resin particle slurry. The azeotroping step also serves to abstract the neutral inorganics from the resin and to destroy the reactive end groups. The reaction solvent-free resin is then separated from the aqueous acid by centrifugation, washed free of acid with deionized water, and vacuum dried.

This prior art purification procedure possesses certain significant limitations:

1. The major portion of the bisphenol A contaminant present in the resin is not removed. Such bisphenol A contaminant significantly reduces the melt stability of the resin. Likewise, most low molecular weight oligomer contaminant is not removed by this prior art purification procedure.

2. All of the inorganic impurities are not removed, possibly due to their encapsulation by the resin. Resin purified by the above procedure generally contains at least about 200 ppm ash, which is unacceptably high for many applications.

3. The final drying step is tedious, and the application to the resin of both heat and vacuum for a considerable period of time is necessary to achieve substantially total removal of the water present.

4. The purification is necessarily a batch operation. From an industrial standpoint it would be clearly be preferable to have a continuous purification process.

SUMMARY OF THE INVENTION

It is an object of this invention to provide an improved process for the purification of impure solid polycarbonate resin.

It is a further object of this invention to provide a new and improved process for the purification of the polycarbonate resin prepared by the reaction of bisphenol A with phosgene in an aqueous alkaline emulsion containing a water-insoluble partial solvent for the polycarbonate.

It is a further object of this invention to provide a process for the purification of such resin which affords product having a low level of contaminating impurities.

It is a still further object to provide a continuous process for such purification.

Further objects and advantages will become apparent from the description of the invention which follows in greater detail.

It has now been found in accordance with my invention that, when the precipitated resin formed by the reaction of bisphenol A and phosgene in an aqueous alkaline emulsion containing a water-insoluble reaction partial solvent for the resin is separated from the reaction medium by conventional methods, preferably by centrifugation, and then neutralized by contacting said resin with acidified extraction solvent selected from the group consisting of aqueous methanol or dimethoxy ethane or mixtures thereof, polycarbonate of high purity is obtained. Advantageously, after such neutralization, the resin is further treated with neutral extraction solvent selected from the above-indicated group.

The aforementioned acidified and neutral extraction solvents may suitably contain from 10 to 35 volume percent water.

The crude precipitated polymer, after separation from the reaction mixture, e.g., by centrifugation, contains about 50,000 ppm ash and is advantageously washed with fresh reaction partial solvent and then with water to remove at least a portion of the contaminants adhering to the surface of the polymer particles prior to contacting said particles with the acidified solvent. Most advantageously, reaction partial solvent having a slightly lower solvent power than that used in the polymerization reaction is employed since we have found that this reduces the swelling of the particles and their tendency to encapsulate impurities and hinder their removal in the subsequent stages of the purification. If desired, the fresh partial solvent utilized in washing the polymer precipitate can be recycled to the polymerization.

The treatment of the resin with acidified extraction solvents serves to (1) neutralize basic inorganic contaminants mainly sodium hydroxide and sodium carbonate, (2) deactivate any reactive chloroformate or phenate end groups on the polymer, (3) remove reaction partial solvent which may still be present in the resin and (4) remove unreacted bisphenol A, low molecular weight oligomer and organic salts present. The further treatment with neutral extraction solvent removes any excess acid present in the polymer and additional unreacted bisphenol A, oligomer and neutral inorganic contaminants.

After the resin has been extracted sufficiently to reduce the contaminant level to a desirably low level, the polymer is separated from the extraction solvent, as for example by centrifugation or filtration, and dried, preferably at reduced pressure with the concomitant application of sufficient heat to raise the temperature of the resin to about 40°–150° C., preferably 80°–125° C.

I have likewise found that impure solid polycarbonate resin produced by other reaction processes can be readily purified by neutralization with acidified extraction solvent selected from the group consisting of aqueous methanol or dimethoxy ethane or mixtures thereof, preferably followed by further extraction with neutral solvent selected from the above group.

The purification process of the instant invention possesses a number of advantages over the purification processes taught by the prior art. Polycarbonate resin having an ash content of substantially less than 100 ppm can be readily obtained by the process of the instant invention compared to generally about 200 or more parts per million for azeotropically purified polycarbonate resin. Also, essentially all unreacted bisphenol A and low molecular weight oligomer will be removed from the polymer particles by the instant process thereby eliminating a significant cause of polymer melt instability. The reaction partial solvent used in the preferred polymerization process is fully miscible in all proportions with the extraction solvent and is therefore also fully removed. This method of purification causes less encapsulation of inorganic salts by the polymer particles, hence a lesser amount of salt is inaccessable to the extraction solvent and remains undissolved and hence unremoved than when the prior art purification methods such as azeotroping are utilized.

The final drying of the extracted polymer is also more readily effected since the extraction solvent to be removed is substantially more volatile than the water which must be removed after azeotropic purification. Although extraction solvents used in my process contains water, there is still a substantially lesser amount of this lower volatility component to be removed. Finally, the instant process lends itself to continuous ambient temperature operation.

As hereinabove indicated the polycarbonate precipitate is purified by extraction with acidified solvent and preferably then further extracted with neutral solvent. This further extraction with neutral solvent removes any excess acid present and also any impurities unremoved during the neutralization step. Preferably the polymer is only treated with sufficient acidified solvent to neutralize all basic constituents and then further removal of contaminants is effectuated with neutral extraction solvent. It is desirable that the dried polymer be completely acid free since the presence of acid may adversely affect the stability of the polymer.

In a preferred embodiment of this invention, the crude polymer precipitate prepared by the aforementioned continuous precipitation process is separated from the reaction mixture by centrifugation and the centrifuge cake washed with fresh reaction partial solvent and with water and then slurried with acidified extraction solvent in a tank. The thus-treated polymer-acidified solvent slurry is then fed continuously into an extraction column against a countercurrent of neutral extraction solvent. The column length and countercurrent flow rate can be readily adjusted by the skilled art worker to insure that the polymer drawn from the bottom of the extraction column contains a desirably low concentration of inorganic and organic contaminants of the types hereinabove mentioned. Of course, if preferred, the acidified solvent/polymer slurry can be subjected to a series of batch extractions with neutral extraction solvent until the desired low level of contaminants is reached.

Where carbonic acid is used to effect the neutralization it is not necessary to take any special steps to remove it since it evaporates when the extracted polymer is dried. In the most preferred embodiment of the instant invention, therefore, the crude polymer precipitate, after washing with reaction partial solvent and water, is fed continuously into an extraction column against a countercurrent of extraction solvent containing carbonic acid. The simultaneously neutralized and full extracted polymer can be drawn from the bottom of the column and additional treatment with acid-free solvent is unnecessary.

In a continuous extraction, the necessary flow rate and column length can be determined, for example, by conducting runs with both the length and the flow rate adjusted so that there is inadequate removal of contaminants and then increasing column length and/or decreasing flow rate until the desired greater degree of contaminant removal is achieved. Likewise, in batch purification, the polymer may be subjected to successive extractions until the desired low level of contaminants is reached. In the instant invention, regardless of whether a continuous or a batch operation is utilized, a point is reached after which further extraction achieves no significant further reduction in contaminant level. For my purification process, this is from about 15 to about 80 ppm of ash. In contradistinction, the prior art purification process is substantially incapable of removing encapsulated bisphenol A or reducing the ash level of the resin below about 200 ppm even by prolonged azeotroping.

In carrying out a purification in accordance with the teaching of the instant invention by either a continuous or a batch operation, the ratio of extraction solvent to polymer being extracted can range from about 5:1 up to about 100:1 by weight. Extraction solvent to polymer ratios of less than 5:1 ordinarily do not achieve sufficient removal of impurities even with extended contact times. Extraction solvent to polymer ratios of greater than 100:1 are wasteful since, as above indicated, a point is reached beyond which further extraction of the polymer removes no additional impurities. These ratios of polymer to solvent refers to the total amount of extraction solvent utilized, i.e., acidified solvent plus neutral solvent or, where a subsequent contacting with neutral solvent is not carried out, to the total amount of acidified solvent.

Ordinarily, an extraction solvent to polymer ratio ranging from about 10:1 to about 30:1 is most suitable. The contact time between the polymer and the extraction solvent will be dependent upon the polymer/solvent ratio and upon the solvent/impurity contact efficiency. Ordinarily, contact times of 5 minutes to 200 minutes are suitable, preferably 15 to 100 minutes.

As hereinabove indicated, suitable extraction solvents have been found to be aqueous methanol or dimethoxy ethane or mixtures thereof with each other. The aqueous component of the extraction solvent can range from 10 up to 35 percent water. Other polar and nonpolar solvents are not suitable for use in a practical industrial scale process generally because they are not sufficiently good solvents for the inorganic contaminants to be removed and, hence, would necessitate unduly high extraction times and solvent/polymer ratios or because their volatility is so low that their removal from the extracted polymer would be difficult, or for both reasons.

Addition of more than 35 volume percent water is not desirable as it tends to render the extraction solvent substantially immiscible with the reaction partial solvent and with bisphenol A and low molecular weight oligomer which are the primary organic impurities which it is sought to remove from the polymer by the extraction process. However, the addition of at least 10 volume percent water to the extraction solvent is desirable in that the solubility of the inorganic salt contaminants is substantially greater than in anhydrous solvent. Most preferably, the extraction solvent is methanol containing from 10 to 30 volume percent water.

As hereinabove indicated, the polymer precipitate is ordinarily first neutralized with acidic extraction solvent and then further treated with neutral extraction solvent either by countercurrent continuous extraction or by successive batch extractions. The quantity of acidified solvent utilized and the concentration of acid therein is not critical. It is only essential that sufficient acid be present to neutralize the inorganic impurities present in the polycarbonate and to deactivate any phenate end groups. Obviously, different extraction solvents can be chosen from among the group above indicated to be suitable for use in the neutralization step and in the subsequent continuous or batch extraction. However, ordinarily no advantage accrues from the use of a variety of extraction solvents in various states of the extraction.

The acid present in the acidified solvent used in the neutralization of the crude polymer precipitate is not critical. Any of the common inorganic acids are suitable such as the hydrogen halide acids, e.g., HCl or HBr, sulfuric, carbonic and phosphoric. Inorganic oxidizing acids such as nitric or perchloric, which would tend to react with the polymer, are unsuitable. Organic mono- and polycarboxylic acids and sulfonic acids having up to seven carbon atoms are likewise suitable. Illustrative examples include formic, acetic, mono-, di- and trichloracetic, oxalic, propionic, butyric and citric acid, and methane, benzene, and p-toluene sulfonic acids. Preferably, the acid used is carbonic, which can be formed by simply pumping carbon dioxide as into the extraction solvent containing at least 1 mol of water per mol of added carbon dioxide. If desired, additional carbon dioxide can be added to the acidified extraction solvent during the neutralization process to maintain the acid concentration level. Additionally, carbonic acid has low corrosivity and is easily removed from the resin.

The temperature at which extraction of the polymer is carried out may be any temperature from about 0° C. up to the boiling point of the extracting solvent. We have not found that significantly more rapid or more complete removal of contaminants is achieved by extraction at temperatures above room temperature. It is therefore preferred for purposes of simplicity and ease of operation to carry out the extraction at approximately ambient temperature.

the invention can be more fully understood by reference to the following examples. All parts are parts by weight unless otherwise expressly noted.

EXAMPLE 1

A 1,500 cc. resin flask was equipped with a condenser, thermometer, addition funnel, gas bubbler, four-bladed stirrer and baffle. The flask was flushed with nitrogen and a nitrogen atmosphere maintained in the flask throughout the reaction. Into the flask was placed 250 cc. of ethylene dichloride, 125 cc. of diisopropyl ether, 125 cc. heptane, and 300 cc. of water containing 3.5 grams of sodium hydroxide, 6 grams bisphenol A and 0.1 gram of benzyltriethylammonium chloride. This mixture was stirred at 500–700 rpm, and 21.5 grams of phosgene and an aqueous solution, heated to 65° C., consisting of 200 cc. water, 0.54 gram benzyltriethylammonium chloride, 25.7 grams of sodium hydroxide and 51.0 grams bisphenol A, was added over a 40-minute period. During the addition, the polycarbonate polymer forms, reaches the desired molecular weight, and precipitates from the reaction mixtures. The polymer was collected by centrifugation and washed with 250 cc. of 50/50 by volume ethylene dichloride/diisopropyl ether and 250 cc. of deionized water.

EXAMPLE 2

A number of batches of polymer prepared as in Example 1 were purified by a variety of techniques.

A. The washed polymer was azeotroped for 30 minutes with 500 cc. of water containing 5 ml. conc. HCl, collected by suction filtration, washed with deionized water, and dried at 100° C. and 0.05 mm. pressure. Ash content = 230 ppm.

B. The washed polymer was slurried with 500 cc. of 80/20 by volume methanol/water containing 5 cc. conc. HCl, for one-half hour, separated by filtration, and then extracted by slurrying for 5 minutes each time with six successive 200-ml. portions of neutral 80/20 methanol/water, separated by filtration, and dried at 100° C. and 0.05 mm. pressure. Ash content = 60 ppm.

C. Purification as in Method B, except 10 successive extractions. Ash content = 54 ppm.

D. Purification as in Method B, except anhydrous methanol utilized for neutralization and extraction. Ash content = 90 ppm.

E. Purification as in Method B, except that 70/30 dimethoxy ethane/water was used in lieu of methanol/water. Ash content = 71 ppm.

F. Purification as in Method B, except neutralization and extractions carried out at 50° C. Ash content = 64 ppm.

G. Purification as in Method B, except 50/50 by volume methanol water utilized for neutralization and extraction. Ash content = 70 ppm.

EXAMPLE 3

Polymer prepared in accordance with Example 1 was slurried with 500 cc. of acidified 80/20 volume methanol/water for one-half hour, separated by filtration, and then extracted for 5 minutes each time with 200-ml. portions of neutral 80/20 methanol/water and dried as in Example 2. Sufficient acid was incorporated into the methanol/water slurry to fully neutralize all basic constituents in the polymer. The results as tabulated below indicate that the acid used has no substantial effect on the ash content of the polymer.

| Acid | Ash Content (ppm) |
| --- | --- |
| $CO_2$ (carbonic) | 65 |
| HCl | 70 |
| Propionic | 90 |
| Citric | 64 |
| $H_2SO_4$ | 70 |
| Formic | 63 |
| Methane Sulfonic | 72 |

EXAMPLE 4

The polymers purified in Example 2 were analyzed for melt viscosity stability, molecular weight distribution and oxidative stability. Polymers purified by Methods A and G had substantially lower oxidative stability and melt viscosity stability and a broader molecular weight distribution than polymers purified by Methods B through F. This is due to the presence of some bisphenol A and low molecular weight oligomer in polymers A and G.

EXAMPLE 5

400 grams of crude polycarbonate prepared as in Example 1 was washed with 500 cc. of 50/50 ethylene dichloride/diisopropyl ether and 500 cc. of distilled water. It was then extracted by passage through a 4-foot-long, 3/4-inch diameter countercurrent extraction column. One gram per minute of the crude polycarbonate resin was fed into the top of the column and 5 cc./min., 75/25 methanol/water saturated with carbon dioxide fed into the column through a bottom injection port. The neutralized and extracted polycarbonate was drawn from the bottom of the column. Ash content = 35 ppm.

Various modifications will be apparent to one skilled in the art, and it is not intended that this invention be limited to the details in the specific examples presented by way of illustration.

I claim:
1. In a process for preparing polycarbonate resins including the steps of
   a. reacting a mixture of phosgene and bisphenol A in an aqueous alkaline reaction medium in the presence of a water-immiscible polycarbonate partial solvent which is inert under the reaction conditions; and
   b. recovering the solid polycarbonate which precipitates from said reaction medium;
   the improvement comprising purifying said resin by contacting said solid polycarbonate with an amount at least sufficient to neutralize the basic impurities present in said polycarbonate of a mixture of an acid and an extracting solvent selected from the group consisting of methanol, dimethoxy ethane and mixtures thereof, which solvent contains from 10 to 35 volume percent water.

2. A process in accordance with claim 1 wherein said partial solvent comprises a mixture of a halogenated $C_1$ to $C_4$ aliphatic hydrocarbon, a $C_2$ to $C_8$ aliphatic ether and a $C_6$ to $C_{10}$ aliphatic hydrocarbon.

3. A process in accordance with claim 1 wherein said precipitated polycarbonate is washed with fresh partial solvent and with water prior to said contacting with acid and extracting solvent.

4. A process in accordance with claim 1 wherein said acid is selected from the group consisting of hydrochloric, carbonic and formic.

5. A process in accordance with claim 4 wherein said acid is carbonic.

6. A process in accordance with claim 1 wherein said neutralized polycarbonate is extracted with acid-free methanol containing not more than 30 volume percent water.

7. A process in accordance with claim 1 wherein the weight ratio of extracting solvent to polycarbonate ranges from about 5:1 to about 100:1.

8. A process in accordance with claim 7 wherein said ratio ranges from about 10:1 to about 30:1.

9. A process in accordance with claim 1 wherein said contacting is carried out by a continuous countercurrent contacting of said precipitated polycarbonate with said solvent.

* * * * *